March 19, 1968     M. J. ALBINAK ET AL     3,374,381
MULTI-COLOR PHOTOLUMINESCENT GLASS SYSTEMS
Filed May 3, 1965     3 Sheets-Sheet 1
FIG. 1
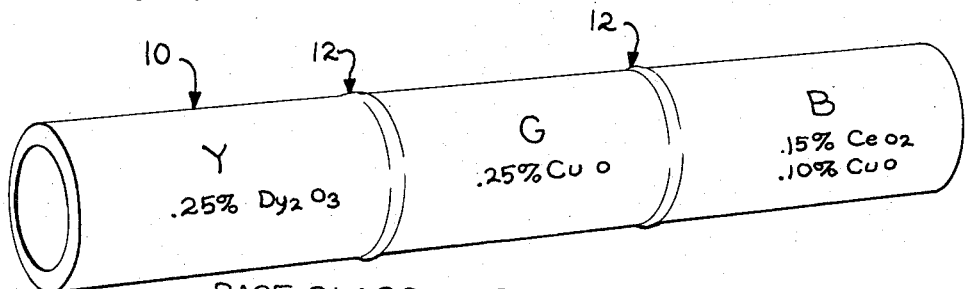
BASE GLASS = BARIUM CROWN
Y     DOPANT = .25% $Dy_2O_3$
G     DOPANT = .25% $CuO$
B     DOPANT = .25% $CeO_2$ + .10% $CuO$
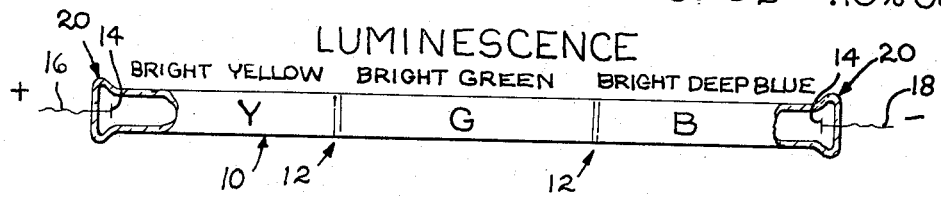
FIG. 2
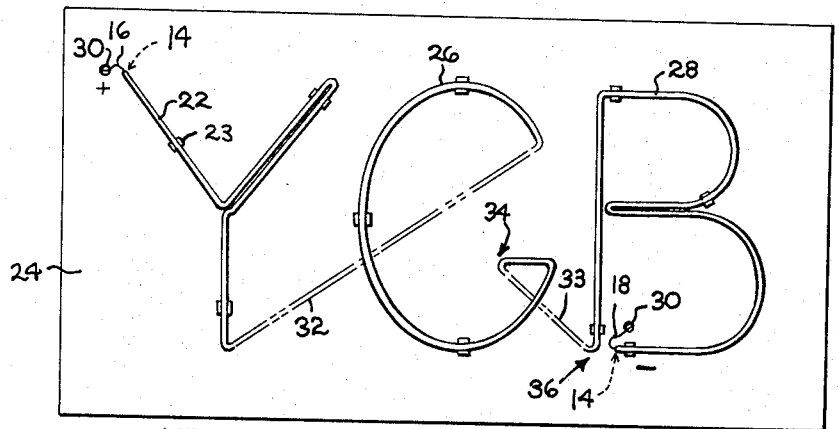
FIG. 3
INVENTORS
MARVIN J. ALBINAK
WARREN H. TURNER
BY
ATTORNEYS

INVENTORS
MARVIN J. ALBINAK
WARREN H. TURNER
ATTORNEYS

March 19, 1968     M. J. ALBINAK ET AL     3,374,381

MULTI-COLOR PHOTOLUMINESCENT GLASS SYSTEMS

Filed May 3, 1965     3 Sheets-Sheet 3

INVENTORS
MARVIN J. ALBINAK
WARREN H. TURNER

BY

ATTORNEYS

United States Patent Office 3,374,381
Patented Mar. 19, 1968

3,374,381
MULTI-COLOR PHOTOLUMINESCENT GLASS SYSTEMS
Marvin J. Albinak and Warren H. Turner, Toledo, Ohio, assignors to Owens-Illinois, Inc., a corporation of Ohio
Filed May 3, 1965, Ser. No. 452,761
4 Claims. (Cl. 313—108)

ABSTRACT OF THE DISCLOSURE

A multi-color photoluminescent glass system wherein separate segments of a common base glass, either rod or tube, and each segment having a different photoluminescent dopant, are joined together into a continuous length element. In the case of a tube, mercury vapor may be placed inside, with electrodes, and activated so that each of the segments will produce a different color, based upon its respective photoluminescent dopant. Within the broad scope of the invention, separate items can be so made and held on a support and activated to produce photoluminescent light output by a separate mercury vapor tube.

A substantial advancement to the art is provided in that multiple colors are produced in a novel and inexpensive manner, using a single excitation source to activate all of the different colored parts.

Since the doped segments are transparent, neon or similar gas can be enclosed in the tube for one color of light, and separately or simultaneously an external excitation source can be played upon the unit for a different set of colors.

This invention relates to photoluminescent glass systems. More particularly, this invention relates to multi-color photoluminescent glass systems utilizing a common base glass for ease of melting and joining separate parts, but compounded with different photoluminescent dopants for the production of different colors of photoluminescence.

BACKGROUND FOR THE INVENTION

In present-day advertising, neon signs are quite widely used. These signs can be made up as composite units, of several different pieces of tubing, each producing a different color, depending upon the gas contained therein. Thus, multiple-color signs are possible and find wide application.

Neon gas is capable of producing red; and other colors can be produced using xenon, krypton and the like. These are all rare gases, produced as by the fractional distillation of liquid air.

Multiple colors in signs of the neon-type, however, are expensive to produce. Thus, each different color requires a separate tube, bent to its own specific shape. Also, each individual tube component must be charged with its own separate gas in order to develop the specific color produced by that gas.

Thus, if the outline or border of the sign is to be red, a tube will be formed to that shape and filled with neon and coupled to its own electrical circuit. The other components of the sign, such as the lettering contained within the red border, will be bent to shape from tubing and filled with gas to produce the particular color desired, and then connected to their own electrical system.

It will be evident that this multiple component construction is expensive by the multiplicity of gas filling operations that must be performed, and by the complexity of the electrical system.

If it were possible to join all of the separate pieces of tubing into a continuous length and yet produce different colors, a substantially simplified constructional system would be provided because only one activating gas and only one electrical circuit would be necessary.

Therefore, a substantial advance to the art would be provided by multi-color photoluminescent glass systems using a single excitation source to activate different colored parts, all of which are produced from a common base glass for ease of fabrication, such as fusing together, but wherein, however, different dopants are used in the different pieces for producing the different colors.

It is therefore an important object of the present invention to provide novel, multiple-color, photoluminescent glass systems.

A further object is to provide a unitary, multiple-color photoluminescent glass system, embodying a single integral internal excitation source.

A further object is to provide a unitary, multiple-color photoluminescent glass system, embodying a single external excitation source.

A further object is to provide a unitary, multiple-color photoluminescent glass system, embodying both a single internal excitation source and a single external excitation source.

A still further object is to provide a multiple-piece, photoluminescent glass system wherein separate parts are made from a common base glass, but using different dopants in each piece to produce different colors of photoluminescence, and utilizing a separate, single excitation source so that solid, rather than tubular parts can be used to produce unique display media.

Other objects of this invention will appear in the following description and appended claims, reference being had to the accompanying drawings forming a part of this specification wherein like reference characters designate corresponding parts in the several views.

FIGURE 1 is a perspective view of a composite, multiple-segment glass tube wherein a single base glass, namely barium crown, is used for producing three separate segments, that are joined together to form the tube, but wherein a different photoluminescent dopant is used in each segment to produce a different photoluminescent color by each of the segments;

FIGURE 2 is an elevational view of a multi-color photoluminescent system made from the composite tube of FIGURE 1, by sealing electrodes into the ends of the tube, filling the tube with mercury vapor as an ultraviolet ray source, and connecting the electrodes to a suitable electrical circuit;

FIGURE 3 is a front elevational view of an advertising sign made from the composite tubing of FIGURES 1 and 2, with the segments being bent respectively into the shapes of letters Y, G, and B, with the letters producing yellow, green, and blue photoluminescence, respectively, thus comprising an integral unit utilizing only one excitation gas and only one electrical circuit;

Figure 4:
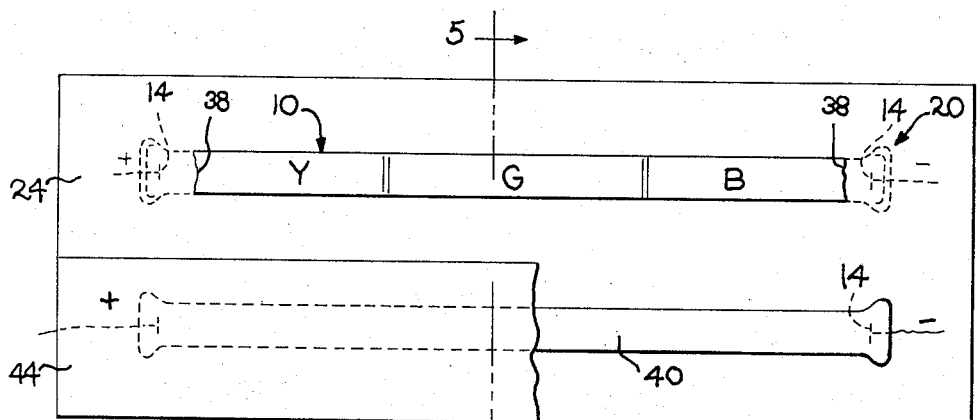
FIGURE 4 is a front elevational view of a dual display sign system using the composite photoluminescent tube of FIGURES 1 and 2, but filled with a color-producing gas such as neon to produce gas-glow light, and additionally using an external excitation source such as a mercury vapor tube to produce a different color of photoluminescence from each of the tube segments.
Figure 5:
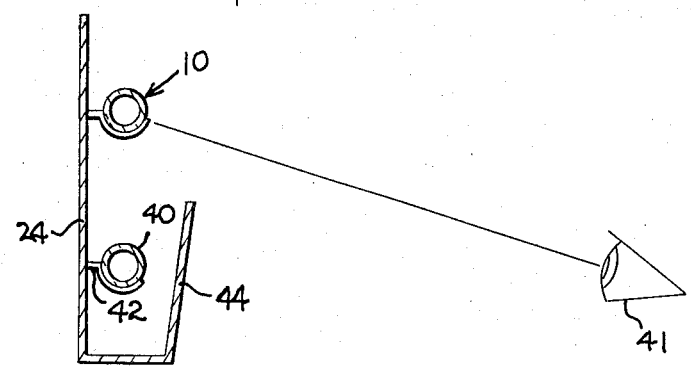
FIGURE 5 is a sectional view taken along the line 5—5 of FIGURE 4.
Figure 6:
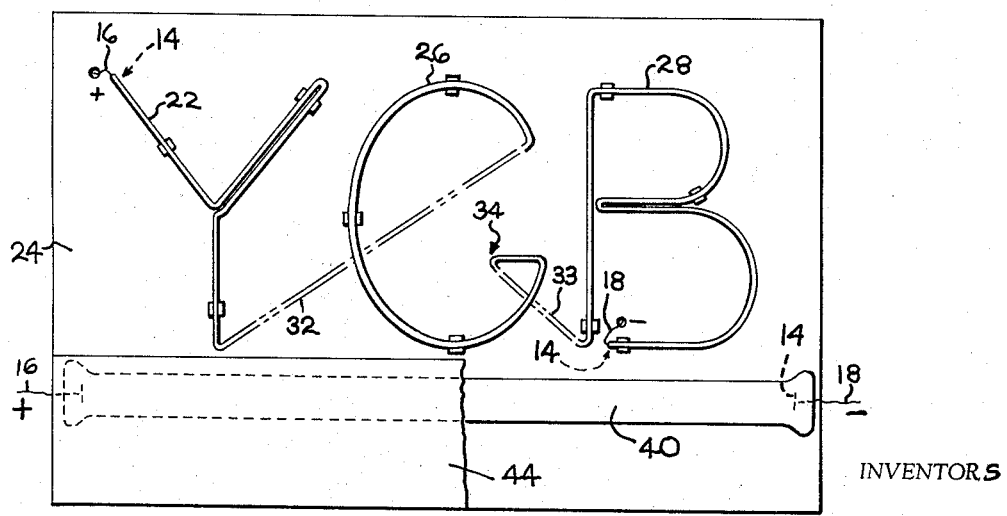
Figure 7:
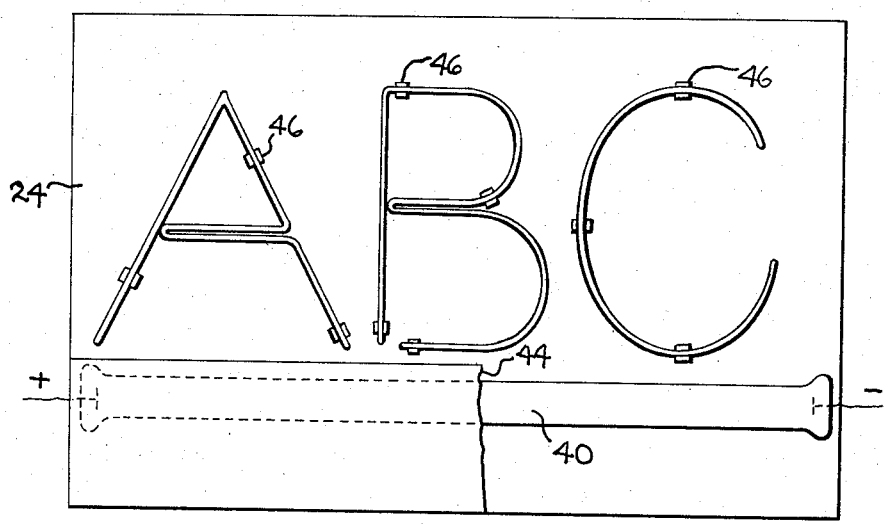
Figure 8:
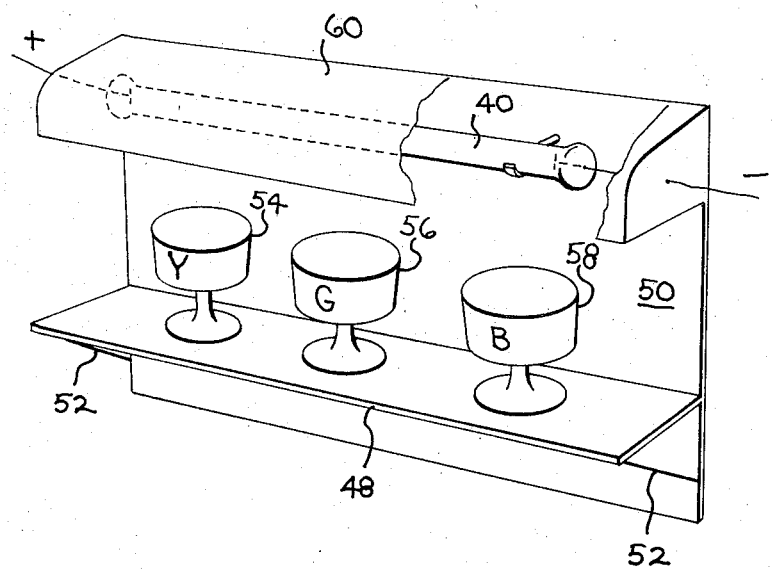

FIGURE 6 is a front elevational view of a dual system advertising sign, using the principles of FIGURES 4 and 5, with the composite tubing bent to the shapes of letters Y, G, and B and filled with a color-producing gas such as neon, to produce a gas-glow colored light as a first color output; and using an external excitation source such as an ultraviolet ray tube to produce yellow, green, and blue photoluminescence from each of the letters as second color output;

FIGURE 7 is a front elevational view of a display system utilizing the principles of FIGURES 1, 4 and 5, but using separate pieces of tubing or rods to produce separate letters which can be detachably connected to the sign for quick interchangeability; and FIGURE 8 is a perspective view of a display system utilizing the principles of FIGURE 7 and using solid photoluminescent articles for a unique display and ready interchangeability.

Before explaining the present invention in detail it is to be understood that the invention is not limited in its application to the particular construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

THE INVENTION: PERSPECTIVE VIEW

The general principle of the present invention comprises the use of a single base glass for economy and ease of manufacture, and for ease of joining different pieces. The base glass is formed into different pieces from as many separate melts as there are different colors to be produced. A different dopant is combined into each melt, for the production of a particular photoluminescence from the pieces made from each melt.

Further, in accordance with the present invention, the various parts are exposed to the excitation rays from a single photoluminescent activating source, such as an ultraviolet ray tube.

THE INVENTION: THE INTEGRAL SYSTEM WITH SELF-CONTAINED EXCITATION SOURCE—FIGURES 1 AND 2

The tube

FIGURE 1 is a perspective view of a composite glass tube made from three separate tube segments, each made of the same barium crown base glass. Each tube segment contains a different photoluminescent dopant, however, and is thus capable of producing a different color of photoluminescent light.

As shown in FIGURE 1, the composite glass tube 10 includes a Y segment, a G segment, and a B segment. These segments are all joined together by means of welds indicated by the reference numerals 12.

When exposed to activating rays, the Y segment will produce bright yellow photoluminescence; the G segment will produce bright green photoluminescence; and the B segment will produce bright, deep blue photoluminescence.

The barium crown glass for producing each of the separate segments Y, G, and B is the same in each instance and was, for this particular tube, melted from the following batch:

| Ingredients: | Parts by weight |
| --- | --- |
| $SiO_2$ | 63.93 |
| $Al_2O_3$ | 1.56 |
| $Na_2O$ | 4.57 |
| $K_2O$ | 10.49 |
| $B_2O_3$ | 2.18 |
| $BaO$ | 17.27 |

The Y segment was made from a melt that had .25 part by weight of dysprosium oxide ($Dy_2O_3$) added as the dopant.

The G segment was made from a melt that had .25 part by weight of copper oxide (CuO) added as dopant.

The B segment had .15 part by weight of cerium oxide ($CeO_2$) plus .1 part by weight of copper oxide (CuO) added in combination as the dopant system.

The multi-color system

FIGURE 2 is an elevational view of a multi-color system made from the tube 10 of FIGURE 1, by sealing electrodes 14 into the ends of the tube. The ends of the tube 10 are pressed closed while heated to a softened condition, as designated by the reference numerals 20. The tube is filled with mercury vapor, for example, and the electrodes 14 are connected to a suitable electrical circuit. The manner in which the electrodes 14 are connected into the circuit is shown schematically, using a positive lead 16 and a negative lead 18.

Mercury vapor is one typical medium for producing activating rays of an appropriate wave length to actuate the various segments of the tubing and produce photoluminescence. The invention is not to be limited, however, as other gases can be used.

The electrical circuit, designated schematically by the positive lead 16 and the negative lead 18, includes an appropriate power source, not shown, to actuate the mercury vapor to produce ultraviolet rays, which in turn are absorbed by the various tubing segments, Y, G, and B, to produce the photoluminescent colors indicated in FIGURE 2.

AN ACTUAL LUMINESCENT SIGN MADE IN ACCORDANCE WITH THE PRESENT INVENTION—FIGURE 3

Here, the Y tubing segment of FIGURES 1 and 2 has been heated and bent to the shape of a Y. This is designated by the reference numeral 22. This Y 22 is fastened by means of suitable clips 23 to a backing support member 24. This is a yellow photoluminescence-producing component of the sign system of FIGURE 3.

The G tubing segment from FIGURES 1 and 2 is suitably formed into an enlarged G, designated by the reference numeral 26, and fastened to the backing support member 24. This is a green photoluminescence-producing component of the sign system of FIGURE 3.

The B tubing segment of FIGURES 1 and 2 has been formed into a large B, designated 28, and suitably fastened to the support member 24. This is a blue photoluminescence-producing component of the sign system of FIGURE 3.

At the upper left hand corner, that is, at the terminal end of the Y 22, an electrode 14 is provided in accordance with the showing of FIGURE 2 and a connection is made to one lead 16 of an electrical circuit.

At the lower right hand corner of the support member 24, the terminal end of the B, numeral 28, is also provided with an electrode 14 in accordance with the showing of FIGURE 2 and a connection is made to the other side 18 of an electrical circuit. The circles 30 represent small holes in support member 24 so that the wires 16 and 18 can be run directly through the support and be kept out of sight, thereby presenting a clean appearance.

In conventional neon sign systems, where letters are connected by intermediate pieces of tubing the intermediate pieces of tubing are blocked out by means of black paint or an opaque covering. This is necessary because the gas glows all along the length of the tubing and thus any unwanted portions must be masked out.

An advantage arises in accordance with the operation of the present invention by the fact that the terminal end of one letter and the beginning end of the next letter can be connected by a piece of undoped, opaque tubing made from the same base glass; thus there is no color produced by the connecting tubing. An opacifier in the connecting opaque tubing sections masks the visible blue glow produced by the mercury vapor. The further advantage that a common base glass is used for ease of joining has been mentioned before. Joining is facilitated because all component pieces have the same coefficient of expansion and softening point; in short, the same physical properties.

As shown in FIGURE 3, a typical undoped piece of tubing is represented by the dotted line 32. This is used to connect the bottom terminus of the Y 22 and the front end of the G 26. The piece of connecting tubing 32 is placed on the front side of the sign because it will not produce light. This will neither need to be masked nor looped behind the support 24 and hidden as would be the case with neon sign construction.

A similar piece of connecting tubing 33 is also used between the terminal end 34 of the G and the front end 36 of the B 28.

From the foregoing, it will be evident that there is provided in accordance with the present invention, a multi-color photoluminescent glass system.

When the Y-G-B lettering system of FIGURE 3 is properly formed and the separate letters interconnected by opaque, non-photoluminescent tubing, a single gas such as mercury vapor can be used as the activating agent. The tubing system is flushed free of air and replaced by the activating gas. Then, when appropriate high frequency electrical energy is run through the tubing, the gas will produce activating energy. This causes the Y 22 to produce bright yellow fluorescence, the G 26 to produce bright green fluorescence, and the B 28 to produce bright deep blue fluorescence.

It will be evident that there is one electrical system, one base glass, and thus a simplified method of manufacturing as distinguished from the complexities of the prior art. Further, economy of manufacture is effected by the fact that the opaque joining pieces of tubing do not produce distracting light and thus do not need to be shielded as in the prior art.

The Y-G-B system described above and shown on the drawings is purely exemplary and is not to be considered as limiting on the invention. Within the scope of the invention, there are many other color combinations possible and other base glasses can be used. These are set forth in the following tabulation forming Table I.

TABLE I

| Base Glass | Dopant | Transmitted light color | Photoluminescent color, long wave μv. |
|---|---|---|---|
| Soda-lime: | | | |
| Low iron | .5% SnO | Colorless | Yellow. |
| Do | .25% $CeO_2$ | do | Bright deep blue. |
| Do | .05% CuO + .05% $Sm_2O_3$ | do | Light green. |

The base glass was made from the following batch:

Ingredients: Parts by weight
$SiO_2$ ----- 71.53
$Al_2O_3$ ----- 1.43
CaO ----- 11.10
MgO ----- 2.70
$Na_2O$ ----- 12.92
$K_2O$ ----- .31

| Base Glass | Dopant | Transmitted light color | Photoluminescent color, long wave μv. |
|---|---|---|---|
| Barium crown | .25% $Dy_2O_3$ | Colorless | Bright yellow. |
| Do | .25% CuO | Very light blue. | Bright green. |
| Do | .10% CuO | Colorless | Medium green. |
| Do | .05% CuO + .10% $SnO_2$ | do | Do. |
| Do | .15% $CeO_2$ + .10% CuO. | Light blue | Bright deep blue. |

The base glass was made from the following batch:

Ingredients: Parts by weight
$SiO_2$ ----- 63.93
$Al_2O_3$ ----- 1.56
$Na_2O$ ----- 4.57
$K_2O$ ----- 10.49
$B_2O_3$ ----- 2.18
BaO ----- 17.27

| Base Glass | Dopant | Transmitted light color | Photoluminescent color, long wave μv. |
|---|---|---|---|
| Li-Mg-Al-Si | .25% $Sm_2O_3$ | Colorless | Orange. |
| Do | .25% $Dy_2O_3$ | do | Yellow. |
| Do | .50% CuO | Colorless to blue. | Green. |

The base glass was made from the following batch:

Ingredients: Parts by weight
$SiO_2$ ----- 57.96
$Al_2O_3$ ----- 17.57
MgO ----- 19.47
$Li_2O$ ----- 5.00

| Base Glass | Dopant | Transmitted light color | Photoluminescent color, long wave μv. |
|---|---|---|---|
| Na-Al-Zn-Si | .25% CuO + .25% SnO. | Copper ruby | Yellow-green. |
| Do | .25% CuO | Colorless | Yellow. |
| Do | .25% $Sm_2O_3$ | Slight yellowish. | Bright orange. |
| Do | .25% $SnO_2$ | do | Pale yellow. |
| Do | 1.0% $Sm_2O_3$ | Colorless | Bright orange. |
| Do | 1.0% $U_3O_8$ | Greenish yellow. | Yellow. |
| Do | 1.0% CuO | Rust-colored; transmits bluish. | Bright butterscotch. |
| Do | .40% CuO + .10% $SnO_2$ | Colorless | Light green. |
| Do | .10% CuO + .40% $SnO_2$. | do | Faint gray-yellow. |

The base glass was made from the following batch:

Ingredients: Parts by weight
$SiO_2$ ----- 64.97
$Al_2O_3$ ----- 9.14
ZnO ----- 14.67
$Na_2O$ ----- 11.17

| Base Glass | Dopant | Transmitted light color | Photoluminescent color, long wave μv. |
|---|---|---|---|
| Borosilicate | 1.01% $SnO_2$ | Colorless | Purplish-white. |
| Do | .05% CuO | Colorless to light green. | Bright, pale blue. |
| Do | .10% SnO | Colorless | Pinkish-white. |

The base glass was made from the following batch:

Ingredients: Parts by weight
$SiO_2$ ----- 76.43
$Al_2O_3$ ----- 5.31
$Na_2O$ ----- 6.31
$B_2O_3$ ----- 11.94

| Base Glass | Dopant | Transmitted light color | Photoluminescent color, long wave μv. |
|---|---|---|---|
| Mg-Al-Si | .38% $Pr_6O_{11}$ | Colorless | Bright yellow. |
| Do | .05% $Eu_2O_3$ | do | Deep, intense blue. |
| Do | .05% $U_3O_8$ | Yellow | Bright yellow. |

The base glass was made from the following batch:

Ingredients: Parts by weight
$SiO_2$ ----- 61.00
$Al_2O_3$ ----- 18.50
MgO ----- 20.50

Base glass ----- Na-Mg-Al-Si.
Dopant ----- .50% CuO.
Transmitted light color ----- Yellow-green.
Photoluminescent color, long wave μv ----- Light green.

The base glass was made from the following batch:

Ingredients: Parts by weight
$SiO_2$ ----- 70.18
$Al_2O_3$ ----- 9.92
MgO ----- 7.84
$Na_2O$ ----- 12.06

EXTENSION OF THE INTEGRAL SYSTEM: EXTERNAL EXCITATION SOURCE—FIGURES 4 AND 5

The prior description has related to a system wherein the composite glass tube contained an internal excitation source, to produce the different photoluminescent colors in the different segments of the composite glass tube.

In a further extension of the invention, the excitation source can be a separate external source, as distinguished from the internal source, previously described. This external source is positioned to radiate to the composite system, and thus cause the component parts thereof to produce different colors of photoluminescence.

Referring to FIGURES 4 and 5, there is shown a composite tube 10, the same as in FIGURE 1. This tube 10 comprises a Y (yellow producing) segment, joined to a G (green producing) segment, and that joined to a B (blue producing) segment. When these segments are exposed to activating rays, they will produce photoluminescence in yellow, green and blue colors respectively. In FIGURE 2, the activating source was shown as being internally contained, in the form of a gas such as mercury vapor filling the tube, with the tube sealed at its ends and having electrodes 14 applied.

This filling gas is not necessary where the excitation source is an external one, as shown in FIGURE 4. Therefore, in FIGURE 4, the ends of the tube 10 are optionally open and without electrodes, exemplified by the naked, composite tube of FIGURE 1. This option, one of two shown in FIGURE 4, is defined between the break lines 38.

In FIGURE 4, the composite tube 10 is shown as being attached to a support member 24. Beneath the composite photoluminescent tube 10, there is mounted an excitation tube 40. This is suitably of the same length as the photoluminescent tube 10 and is fastened to the support member 24 immediately beneath the tube 10. Bracket members 42 as shown in FIGURE 5 are utilized to support tubes 10 and 40.

The excitation tube 40 is sealed closed at each end and electrodes 14 are applied in a manner previously described relative to FIGURE 2. The tube 40 is of clear, non-photoluminescent glass, and is filled with an excitation gas such as mercury vapor. The rays produced by this tube will be radiated upwardly and strike the composite tube 10 and cause the segments Y, G and B to glow with yellow, green and blue photoluminescence, respectively.

A shield member 44 is placed in front of the excitation tube 40 so that any visible rays, such as the pale purplish glow typical of mercury vapor, is blocked from the viewer, typified by the eye 41, FIGURE 5.

It is to be noted that the components Y, G and B of composite tube 10 all are capable of transmitting light. This suggests a further extension of the invention as follows.

THE EXTERNAL-INTERNAL EXCITATION EMBODIMENT—FIGURES 4 AND 5 ALSO

The photoluminescent tube 10 of FIGURE 4 can be optionally sealed at the ends as indicated at 20 and electrodes 14 applied. This alternate embodiment is shown in dotted outline in FIGURE 4. In this extension of the invention, the tube 10 is filled with a gas that will glow vividly under the influence of an electrical discharge. Typical gases include neon, xenon, krypton, and the like.

By so operating, a dual system is provided as follows:

(1) The glow gas color such as red from neon excitation is provided by separately applying electrical energy through tube 10;

(2) Yellow, green and blue photoluminescence are provided by separately actuating the ultraviolet tube 40 and impinging the rays on the photoluminescent tube 10, with the tube 10 electrical system turned off; and (3) Another visible impression is possible, as produced by activating both the glow gas electrical system and the activating ray tube 40 to produce a combination of photoluminescent and gas glow discharge colors.

AN APPLICATION OF THE DUAL SYSTEM OF FIGURE 4—FIGURE 6

In FIGURE 6, a dual system sign is shown. This comprises a support member 24. The composite Y-G-B tube of FIGURE 3 is fastened upon the support member 24. The composite tube Y-G-B comprises the Y (yellow photoluminescence-producing) section 22, the G (green photoluminescence-producing) section 26, and the B (blue photoluminescence-producing) section 28, all of which are joined together at their ends by non-photoluminescent sections 32 and 33.

In this embodiment of the invention, the sections 32 and 33 must be coated with an opaque masking material such as black paint or opaque tape. This prevents the glow gas color from showing through the interconnecting portions 32 and 33.

As will be recalled, the composite tube Y-G-B is continuous between the anode end 16 and the cathode end 18 and electrodes 14 are sealed into the ends of the tube in accordance with FIGURES 2 and 4.

In this embodiment, however, as in the alternate embodiment of FIGURES 4 and 5, the tube 22, 32, 26, 33, 28 is filled with neon or other glow-type gas instead of a short wave-activating gas.

An activator tube 40 is mounted along the bottom of the sign with an appropriate shield element 44 positioned in front of it to render it invisible. If desired or necessary, another tube of the nature of tube 40 can be mounted along the top of the sign for appropriate intensity of activating rays.

By operating in acordance with the system of FIGURE 6, the following light system is provided:

(1) *Alternate operation.*—The gas-glow system, comprising the gas contained within the tubing 22, 26, 28 and 32 and 33, can be actuated and all of the letters 22, 26, 28 will produce the same color of light, such as red from neon; or whatever color the contained gas, such as xenon, krypton or other produces. When this system is in operation, the activator tube 40 will not be in operation.

(2) *Alternate operation.*—The gas-glow system within the tube Y-G-B can be turned off and the activating ray tube 40 turned on. Under this condition, photoluminescent colors will be produced. These will be yellow in the Y 22 segment, green in the G 26 segment, and blue in the B 28 segment. When this system is in operation, the neon system will be turned off.

(3) *Dual operation.*—Also, the combination of the two electrical systems is available by actuating both electrical circuits simultaneously. Thus, the combination of the glow-gas color and the three luminescent colors is possible.

It will be evident from the foregoing that the sign has a total of three facets.

The versatility of the system and the advance provided to the art are believed to be self-evident from the foregoing.

THE EXTERNAL SOURCE—SEPARATE PIECE EMBODIMENT—FIGURES 7 AND 8

The removable letters

This arrangement provides a sign wherein the letters can be changed at will because there are no electrical connections to them. This of course would be the same situation existing with the tube in FIGURE 4 where a tube 10 terminating at the broken line 38 would be employed.

Thus, in accordance with this aspect of the invention, the letters can be replaceably attached to the backing 24 by appropriate friction-type clip members for quick interchangeability.

As shown in FIGURE 7, the letters A, B and C are connected to the backing 24 by means of suitable clips 46. These clips 46 are diagrammatically illustrated and thus can take a wide variety of forms, as will be evident to those skilled in the art.

The letters A, B, and C are made of a suitable base glass and can have the same or different photoluminescent dopants incorporated into them in order to provide the same or different colors of photoluminescence.

In FIGURE 7, the letters A, B, and C may be made of tubing or rod.

The various glass formulae for producing suitable luminescent colors are set forth in Table I.

The activator tube

The activator tube 40 in FIGURE 7 is the same as that described in FIGURE 6. This tube 40 is mounted along the bottom edge of the backing support 24 with an appropriate shield element 44 positioned in front of it. If desired, another tube 40 can be mounted along the top edge of the backing member 24 for added intensity of photoluminescent activator emission.

By operating in accordance with the system of FIGURE 7, the following light system is provided:

The activator tube 40 radiates its activating rays to the letters A, B and C and causes them to produce their respective colors of photoluminescence.

If desired, the letters A, B and C can be changed quickly, as in commercial advertising, where change of the advertising slogan is often desirable.

Also, if desired, and to be considered within the scope of the present invention, the letters A, B and C can be mounted upon a rotating support and the tube 40 fastened to a fixed support positioned adjacent to the rotating support. Thus a moving display can be provided.

By using this type of arrangement, the letters can be changed at the back side of the rotating support, thus out of view, and as the rotating support is rotating. Thus, a constantly changing display as well as a movable one can be provided in accordance with the present invention.

This is made possible by the fact that the letters A, B and C are not connected to one another and are detachably connected to the backing member 24.

Different gases in letters A, B and C

The embodiment of FIGURE 7 provides an environment in which the letters A, B, and C could well be permanently fastened to the support 24 and made of tubing. Then, these could be filled with different gases such as neon, krypton, xenon, or the like. By applying electrodes and suitable electrical circuits, the letters could be made to give off different colors depending upon the emissions of the gases contained therein.

Then, either separately or simultaneously with the emissions from the gases, the tube 40 could be activated to produce the fluorescence from the glass of which the letters A, B and C are made.

The foregoing represents to a degree, the versatility inherent in the present invention.

Further logical extension of the invention—FIGURE 8

This embodiment of the invention provides a combination of decorative articles of solid photoluminescent glass and an activating energy tube positioned adjacent thereto.

For purposes of illustrating this aspect of the invention, a barware display device is shown in FIGURE 8, that embodies the principles of the present invention. A shelf or support 48 is suitably attached to a wall 50 using support brackets 52.

A plurality of barware pieces 54, 56 and 58 are positioned on the shelf 48.

The barware piece 54 is suitably made of barium crown glass doped with .25 part by weight of dysprosium oxide ($Dy_2O_3$). Thus it is capable of producing yellow photoluminescence.

The barware piece 56 is suitably made of clear barium crown glass doped with .25 part by weight of copper oxide (CuO). Thus it is capable of producing green photoluminescence.

The barware piece 58 is suitably made of clear barium crown glass doped with .15 part by weight of cerium oxide ($CeO_2$) plus .1 part by weight of copper oxide (CuO) in combination. This barware piece is capable of producing blue photoluminescence.

The various formulations as listed in Table I can be employed within the scope of the invention for manufacturing separate items of solid glass of the nature shown in FIGURE 8 and designated by the reference numerals 54, 56 and 58.

Above the shelf 48, there is positioned an activator tube 40 of the nature shown in FIGURES 5, 6 and 7. This is suitably mounted beneath a shield 60 so as to be concealed. Thus, the barware pieces 54, 56 and 58 can be viewed without observing the activator tube 40.

It is of course to be understood that a plurality of activator tubes can be placed beneath the cover 60 for sufficient intensity of activating rays if desired.

From the foregoing it will be evident that an attractive, unusual and versatile display is shown in FIGURE 8 of the drawings.

In the extended scope of the invention, it is to be understood that items of various shapes of either solid or hollow construction, but made of photoluminescent glass, can be placed upon the shelf 48 of FIGURE 8. Thus ready interchangeability of the viewed parts is evident within the scope of the invention.

What is claimed is:

1. In a photoluminescent system,
   a hollow article made of photoluminescent glass,
   a visible light-producing gas sealed within said hollow article,
   electrical circuit means connected into said hollow article to activate said light-producing gas,
   a photoluminescent activating ray tube positioned adjacent to said photoluminescent glass article,
   and means for activating said activating ray tube,
   whereby visible light is produced by said gas within said hollow article and activating rays from said activating ray tube are directed into contact with said hollow article to produce photoluminescent light.

2. In a photoluminescent system,
   a base,
   a composite article comprising a plurality of hollow segments made of the same base glass,
   each segment containing a different photoluminescent dopant,
   hollow segments made of said same base glass and fused to and joining said photoluminescent segments to one another into the composite article with a common hollow interior,
   said connecting segments containing an opacifier but no photoluminescent dopant,
   means connecting said composite article to said base,
   a visible light-producing gas sealed within said hollow composite article,
   electrical circuit means connected to said hollow composite article to activate said light-producing gas,
   a photoluminescent activating ray tube positioned adjacent to the outside of said composite article,
   and means for activating said activating ray tube,
   whereby visible light is produced by said gas within said composite article and activating rays from said activating ray tube are directed into contact with said composite article to produce different colors of photoluminescent light therefrom.

3. In a photoluminescent system,
   a base,
   at least two separate hollow articles of photoluminescent glass,
   means connecting said articles to said base, each of said articles containing a different photoluminescent dopant, a visible light-producing gas sealed within at least one of said hollow articles, electrical circuit means connected into said hollow articles to activate said light-producing gas, a photoluminescent activator ray tube positioned adjacent to said hollow articles, and means for activating said activator ray tube, whereby visible light is produced by said gas within said article and activating rays from said activator ray tube are directed into contact with said photoluminescent articles to produce different colors of photoluminescent light therefrom.

4. A composite article comprising at least two hollow segments made of the same base glass and fused together, each segment containing a different photoluminescent dopant, said segments providing a common, hollow interior, a vivid glow gas within said interior, electrical circuit means for activating said glow gas to provide vsible light from the gas without exciting said dopants, and means external to said segments for generating activating rays and directing them into contact with said segments to excite said respective photoluminescent dopants and simultaneously provide at least two different colors of photoluminescent output from the composite article.

References Cited

UNITED STATES PATENTS

| | | | |
|---|---|---|---|
| 2,043,925 | 6/1936 | Epstein | 313—109 X |
| 2,097,275 | 10/1937 | Fischer | 313—108 |
| 2,413,940 | 1/1947 | Bickford | 313—109 |
| 2,486,859 | 11/1949 | Meijer | 250—71 X |

JAMES W. LAWRENCE, *Primary Examiner.*

R. JUDD, *Assistant Examiner.*